Jan. 12, 1932.　　F. J. GOUGH　　1,840,443
FOAM CELL
Filed April 29, 1929　　4 Sheets-Sheet 3
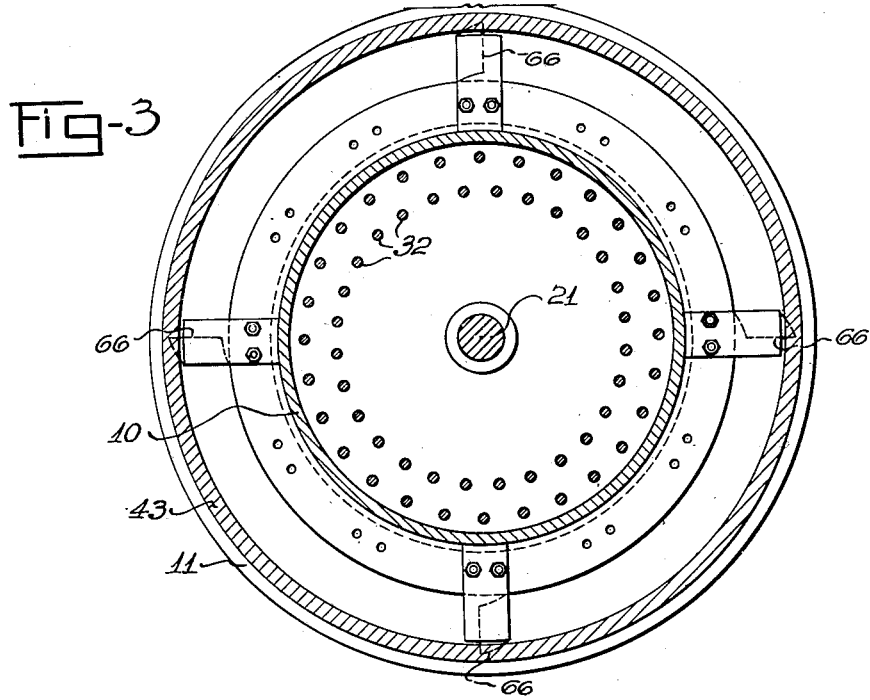
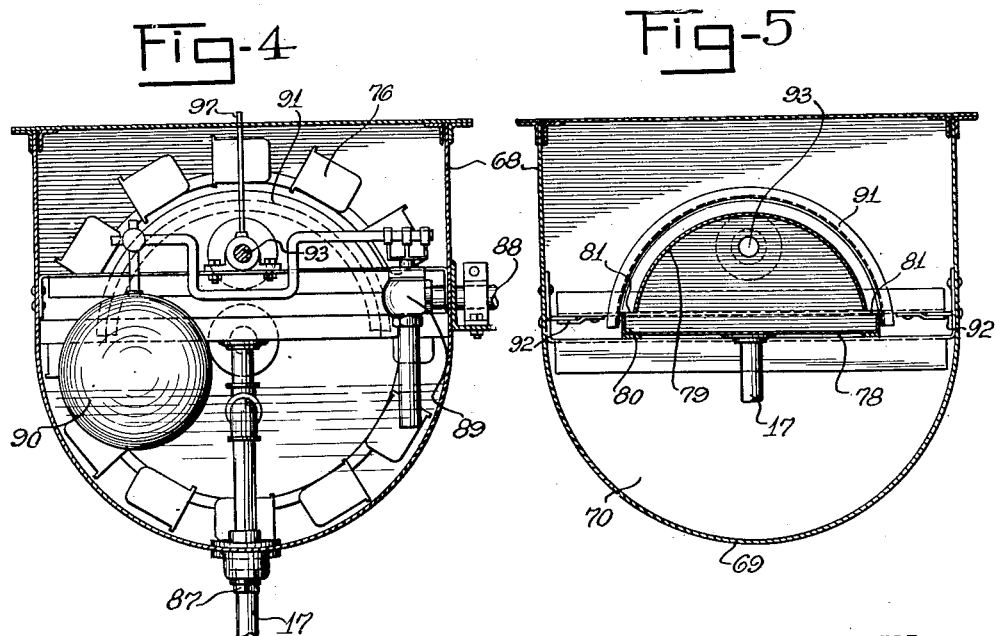
INVENTOR
FRED J. GOUGH.
BY
L. A. Paley
ATTORNEY Jan. 12, 1932.                F. J. GOUGH                 1,840,443
                               FOAM CELL
                    Filed April 29, 1929    4 Sheets-Sheet 4
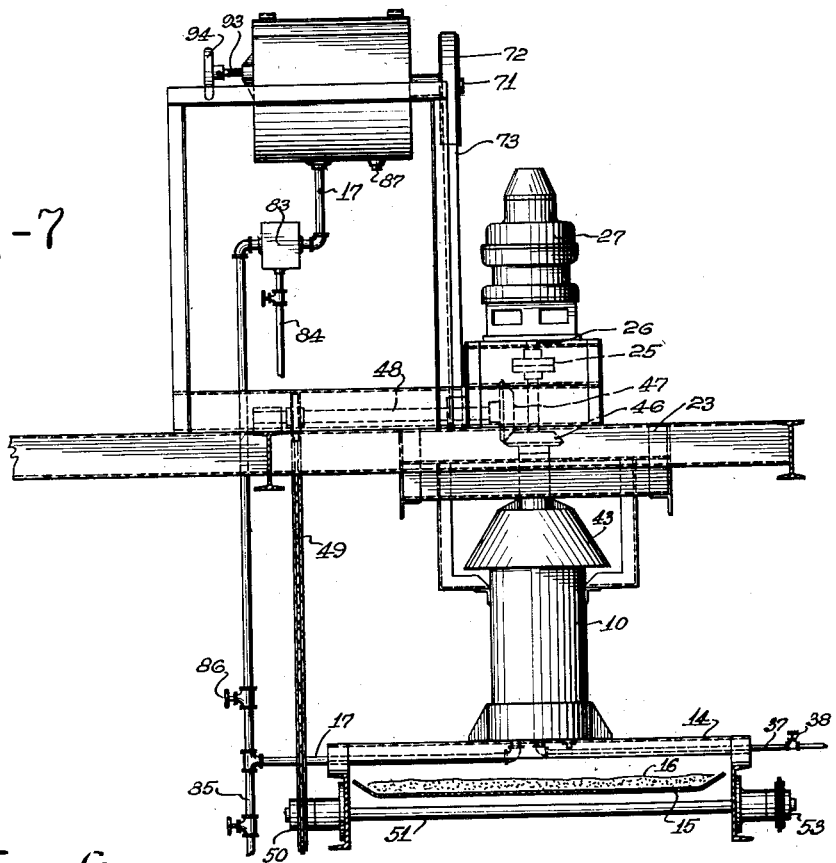
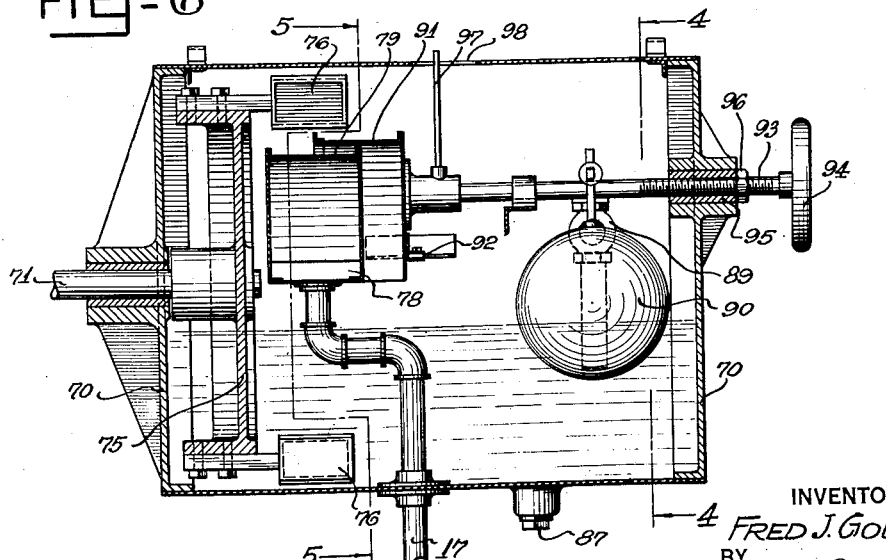
INVENTOR
FRED J. GOUGH.
BY
L. A. Paley
ATTORNEY Patented Jan. 12, 1932

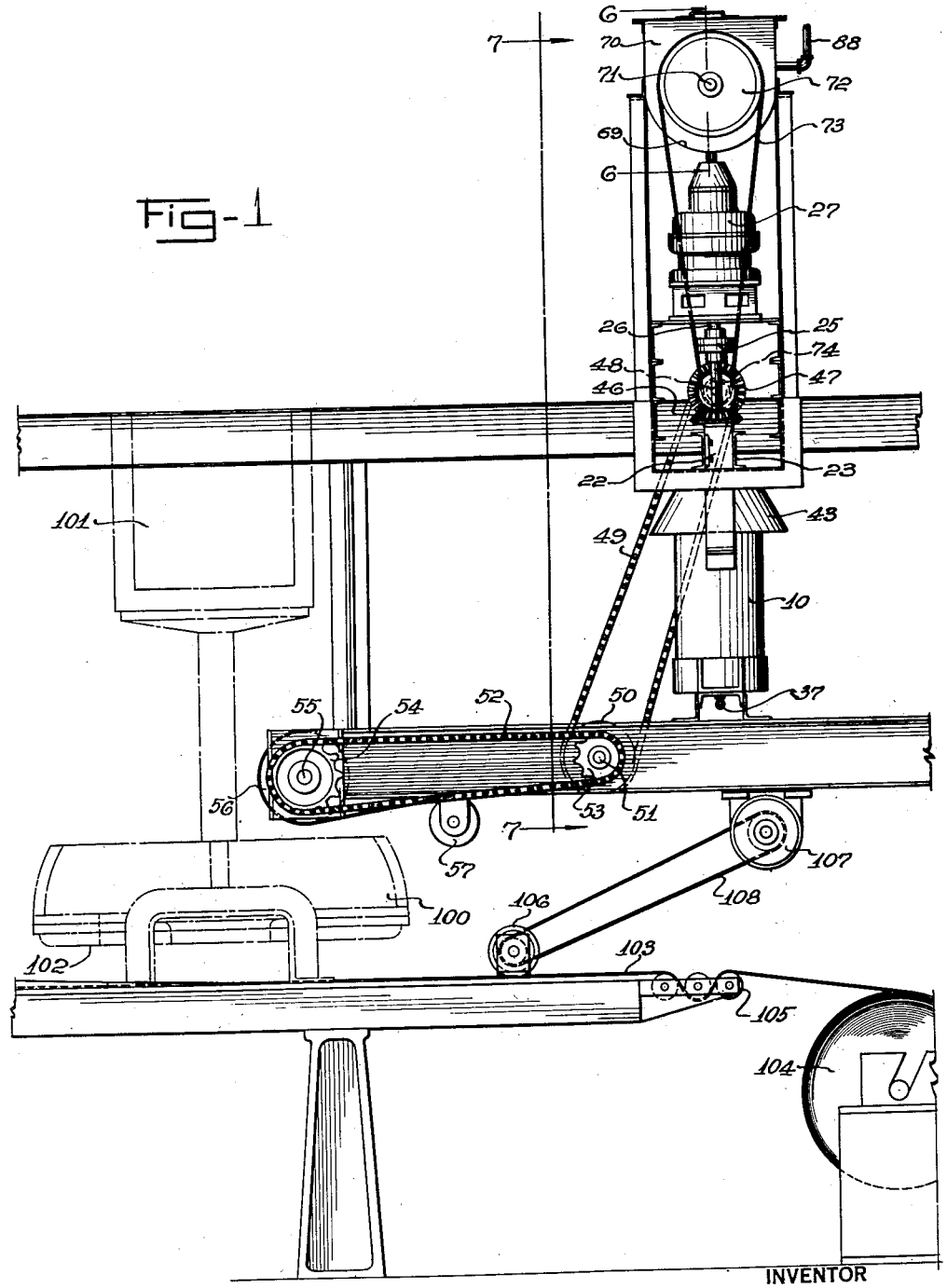

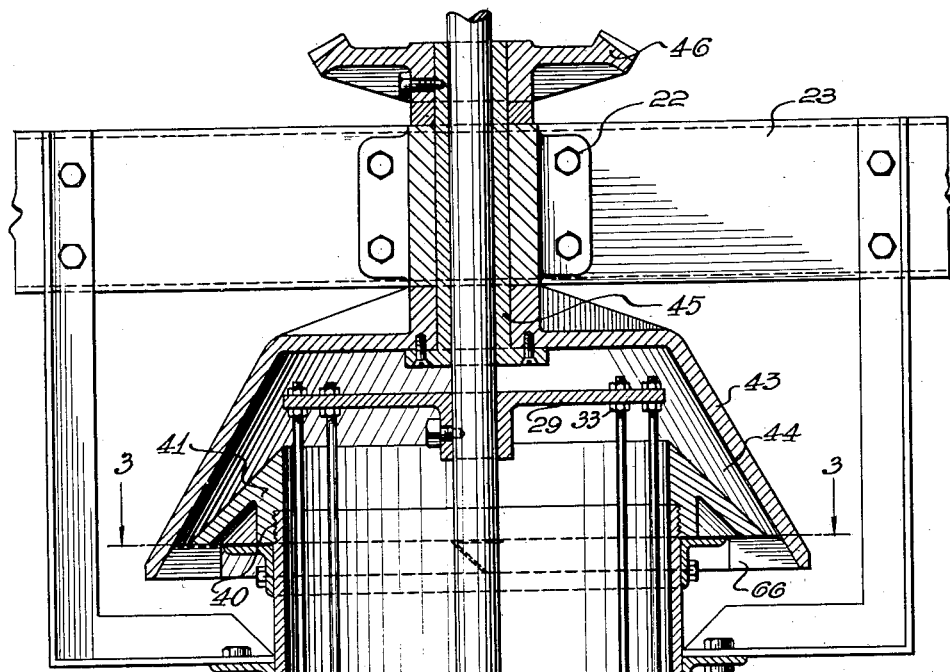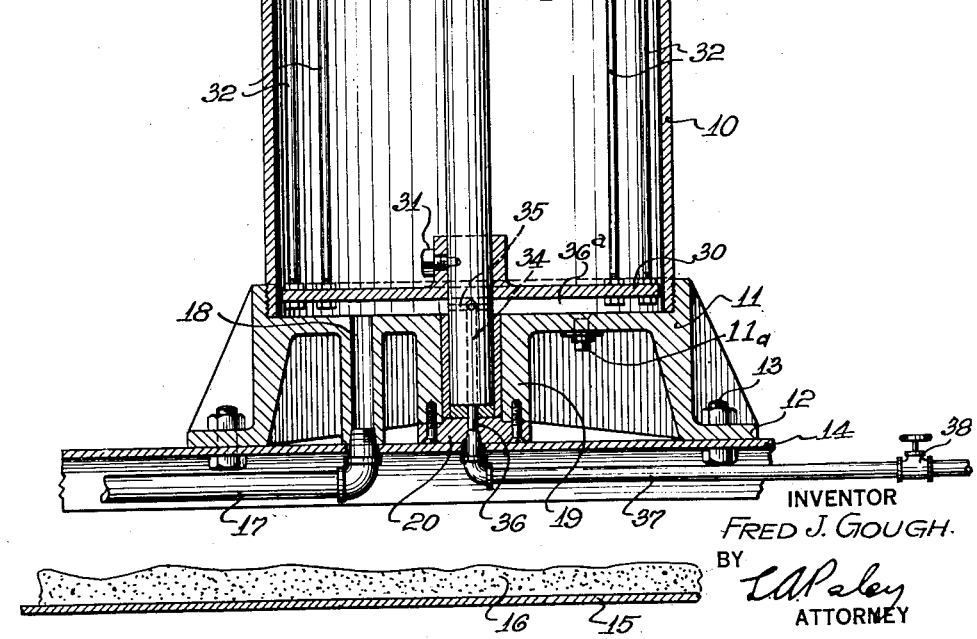

1,840,443

UNITED STATES PATENT OFFICE

FRED J. GOUGH, OF FORT DODGE, IOWA, ASSIGNOR TO UNITED STATES GYPSUM COMPANY, OF CHICAGO, ILLINOIS, A CORPORATION OF ILLINOIS

FOAM CELL

Application filed April 29, 1929. Serial No. 358,850.

This invention relates to means for the production of foam and has reference more particularly to an apparatus for the manufacture of lightweight foam, the latter usually being used for mixing with plastic substances, such as gypsum stucco.

Lightweight foams are often produced which are so light in weight that they lack fluidity, or in other words, cannot be made to flow from one point to another under the action of gravity. In the mixing of these lightweight foams, with plastic materials, such as stucco, water or other plastic materials while said materials are carried along on an endless belt to be used in the manufacture of plasterboards, it is desirable that a uniform feed of the foam be made to the plastic material belt so that a constant percentage of foam is added to the plastic material at all times. In order to secure a constant flow of foam, it is also necessary that a constant quantity of foam solution be delivered to the foam cell at all times.

An object of this invention, therefore, is to provide a foam cell having a uniform feed of foam solution to the cell at all times and also having a uniform delivery of foam to the plastic material carried along on the mixing belt; also to improve foam producing apparatus in other respects hereinafter specified and claimed.

Reference is to be had to the accompanying drawings forming a part of this specification, in which Fig. 1 is an elevation of my improved foam cell with associated devices, Fig. 2 is a central sectional elevation through the foam cell, Fig. 3 is a sectional view through the foam cell taken on the line 3—3 of Figure 2, Fig. 4 is a sectional elevation through the foam solution feeding device taken on the line 4—4 of Figure 6, Fig. 5 is a sectional elevation through the solution feeding device taken on the line 5—5 of Figure 6, Fig. 6 is a sectional elevation through the solution feeding device taken on the line 6—6 of Figure 1, and Fig. 7 is a sectional elevation through the assembled apparatus taken on the line 7—7 of Figure 1.

My foam cell is preferably in the form of a cylindrical casing 10 positioned with its axis substantially vertical, the bottom of said casing being screwed or otherwise fixed, into a cast base 11 having outstanding lugs 12 which are secured by bolts 13 to suitable machine framework 14 the latter being mounted directly over a mixing belt 15 which carries the plastic material 16 such as a mixture of gypsum stucco and water.

A solution feed pipe 17 is secured adjacent a hole 18 in the base 11, said solution pipe leading from a solution feeding device to be hereinafter described. A drain plug 11a is also provided in the base 11. A bearing 19 is also formed centrally in the base 11, said bearing having a set bearing cap 20 adapted to support the lower end of a shaft 21. The upper end of shaft 21 is rotatably supported by a bearing 22 which is secured to suitable frame members 23 forming part of the framework of the machine. The upper end of shaft 21 is also connected by a coupling 25 to a motor shaft 26, the latter being associated with a vertical motor 27 which is adapted to cause the rapid rotation of the shaft 21.

An upper plate 29 and a lower plate 30 are secured by bolts 31, or other means, to the shaft 21 in spaced relation, said plates being connected by parallel beating or whipping rods 32 which are arranged in a plurality of annular series. These rods are connected by nuts 33 to the plates 29 and 30 so as to make a rigid agitating, beating or whipping unit inside of the casing 10. The lower end of shaft 21 has a hole 34 extending vertically and is connected with a transverse hole 35 which opens into the space 36a below the lower plate 30. A hole 36 passes through the bearing cap 20 and a pipe 37 is connected to said cap adjacent the hole 36, said pipe being for the purpose of supplying compressed air to the foam cell and having a valve 38 to accurately control the amount of air supplied. Thus the compressed air mixes with the foam making solution in the space 36 and then passes upwardly about the periphery of the plate 30 to be whipped into foam by the beater rods 32.

Secured to the upper end of casing 10, as by screw threads 40, is a frusto-conical delivery ring 41 which acts as an overflow baffle for the foam. A frusto-conical dome or drum 43 is rotatably mounted above the delivery ring 41, so as to form an annular space 44 which gradually tapers so as to maintain a substantially uniform area as the circumference of the ring 41 increases. The dome 43 is secured to a sleeve 45 which is rotatably mounted on the shaft 21 inside of the bearing 22. This sleeve is provided at its upper end with a bevel gear 46 which meshes with a similar bevel gear 47, the latter being secured to a transversely extending shaft 48 which is rotatably mounted in suitable bearings, not shown on the framework of the machine. The shaft 48 is provided with a sprocket wheel connected by a chain 49 to a sprocket wheel 50 secured to a countershaft 51. A chain 52 connects a sprocket wheel 53 on shaft 51 to a sprocket wheel 54 on a shaft 55. The shaft 55 also carries a pulley 56 which serves to drive the mixing belt 15 with a continuous motion, and an idler pulley 57 is rotatably mounted below said belt to maintain a uniform tension therein.

I have found that with a speed of 750 R. P. M. on the shaft 21, and a speed of 30 to 40 R. P. M. on the drum 43, satisfactory results are obtained and the foam oozes out from the space 44 as new foam is continually produced by the action of the beating rods 32 the mixture of foam solution and air. However, the speed of shaft 21 may be considerably varied, say between the limits of 500 to 1200 R. P. M. and still produce satisfactory results. In order to cause a uniform separation of the foam delivered from space 44, a series of angularly disposed scrapers 66 are secured to the outside of the casing 10 immediately below the delivery ring 41. As the drum 43 rotates, the foam is carried down to contact with the scrapers 66 and is cut off so that a uniform delivery of the foam to the plastic material 16 is obtained.

It should be noted that when the drive shaft 55 or the mixing belt 15 stop, the rotation of the delivery drum 43 also stops so that the introduction of a large amount of foam to the plastic material 16 at any one location is entirely prevented. However, the rotation of the beater rods 32 continues even when the delivery belt 15 stops. In order to prevent the formation of any additional foam, the feeding device for supplying the foam solution through pipe 17 to casing 10 is geared to the shaft 48 so that when the mixing belt 15 stops, the delivery of further foam solution to the casing 10 is also stopped.

This solution feeding device for insuring a uniform delivery of solution to the casing 10 may be of any suitable construction but in the preferred form, it consists of casing 68 having a semi-cylindrical bottom 69 and square end 70. A shaft 71 is rotatably mounted in suitable bearings secured to one of the ends 70 and said shaft is provided with a pulley 72 connected by belt 73 to a pulley 74 on shaft 48. A dipper wheel 75 is secured to the shaft 71 and an annular series of dippers 76 is secured around the periphery of said wheel 75. After these dippers dip down into the solution lying in the bottom 69, they then rise to their uppermost position, a quantity of solution is delivered into a catch basin 78 which is partially covered by a semi-cylindrical cover 79, said cover being spaced apart from the walls 80 of said catch basin so as to provide a space 81 for the solution to run down into said catch basin. The upper end of pipe 17 is connected to the catch basin 78 so that the solution flows down said pipe into the cell casing 10. A mud trap 83 is provided on the pipe 17, said mud trap being provided with a valve controlled drain pipe 84. A valve controlled drain pipe 85 is also connected to the line 17 so that all solution may be drained out of the casing 10. Valve 86 is provided on line 17 so as to completely stop the flow of solution to the cell casing 10. A screw plug 87 is provided in the bottom 69 to drain the solution from the solution chamber if desired.

Solution is admitted to the solution chamber through a pipe 88 which is provided with a float valve 89 controlled by float 90 so as to maintain a constant level of solution in said feed chamber. It is desirable also to vary at will the amount of solution flowing into the casing 10 and this is accomplished by means of a shield 91, which is slidably supported on slide runners 92, said shield being rotatably connected to a threaded rod 93 provided with a hand wheel 94. The threaded rod passes through a threaded bushing 95 in one end 70 of the feed chamber and a lock nut 96 locks the wheel 94 in any adjusted position. An indicator rod 97 secured to the shield 91 extends upwardly through an opening 98 in the feed chamber so as to indicate the amount of solution being delivered to the casing 10.

The mixing belt 15 is preferably trough-shaped and delivers the plastic material 16, and its measured amount of foam, into a mixer 100 of any suitable design, said mixer being operated by a motor 101. This mixer 100 discharges the mixed foam and plastic material through an opening 102 onto a moving strip of paper 103 which is continually unwound from a rotatably mounted roll of paper 104, said paper strip passing between tension rods 105. Scoring wheels 106 preferably made of carborundum, operate near the edges of the paper, and these scoring wheels are driven by motor 107 through belt 108, thus preparing the paper for folding about the edges of the plastic material mixed with the foam.

In operation, the foam solution flows through pipe 88 from any suitable source into the bottom 69 of the feed chamber, the level of the solution being controlled by the float valve 89 operated by float 90. The dipper wheel 75 driven from shaft 48, causes dippers 76 to deliver the solution into catch basin 78, the amount of said solution being varied at will by rotating hand wheel 94 which operates shield 91. A measured quantity of solution flows down pipe 17 through mud trap 83 and into the bottom of the cell base 11 where it mixes with compressed air introduced through pipe 37 and holes 34 and 35. The mixture of compressed air and foam solution passes up around the periphery of bottom beater plate 30 where it is engaged by rapidly rotating beater rods 32 and whipped into a foam. The foam passes out space 44 between rotating dome 43 and stationary delivery ring 41, a measured quantity of foam being scraped off by stationary scrapers 66 after which it falls downwardly onto the plastic material 16 supported upon mixing belt 15.

I would state in conclusion that while the illustrated example constitutes a practical embodiment of my invention, I do not wish to limit myself precisely to these details, since manifestly, the same may be considerably varied without departing from the spirit of the invention as defined in the appended claims.

Having thus described my invention, I claim as new, and desire to secure by Letters Patent:—

1. In a foam apparatus, a cylindrical casing arranged with its axis substantially vertical, a shaft rotatably associated with said casing, a plurality of spaced parallel plates secured to said shaft within said casing, beater elements associated with said plates, means for introducing foam solution and compressed air below the lowermost of said plates so that the mixed foam solution and compressed air passes upwardly around the periphery of said plate to be whipped into foam by said beater elements, and means for delivering the foam produced from the top of said casing.

2. In a foam apparatus, a cylindrical casing having its axis extending substantially vertically, beater elements rotatably mounted within the casing, means for introducing foam solution and compressed air into said casing to be whipped into foam by said beater elements, and a rotatably mounted delivery dome adjacent the top of said casing adapted to deliver the foam from said casing.

3. In a foam apparatus, a cylindrical casing having its axis extending substantially vertically, beater elements rotatably mounted within said casing, means for introducing foam solution and compressed air into said casing, a rotatably mounted delivery dome associated with the top of said casing, and a scraper device adapted to cause a uniform delivery of foam from said delivery dome.

4. In a foam apparatus, a casing, a shaft rotatably associated with said casing, means for introducing foam solution and compressed air into the bottom of said casing, beater elements within said casing and attached to said shaft and adapted to whip the foam solution and compressed air into foam, a rotatably mounted delivery dome associated with the top of said casing, and means for rotating the delivery dome at a speed different from that of the beater elements.

5. In a foam apparatus, a casing, beater elements rotatably mounted within said casing, means for introducing foam solution and compressed air into said casing, a delivery ring associated with said casing, a rotatably mounted delivery dome adjacent said delivery ring and forming a delivery space therebetween, means for rotating said drum at a speed different from that of said beating dome, and scraping means adapted to cause a uniform flow of foam from said ring and drum to a discharge point.

6. In a foam apparatus, a casing, a shaft rotatably mounted within said casing, beater elements associated with said shaft, means for introducing foam solution and compressed air into the bottom of said casing, a sleeve rotatably associated with said shaft adjacent the top of said casing, a delivery drum secured to said sleeve for the purpose of securing a uniform flow of foam from said casing, and means for rotating said drum at a speed different from the speed of rotation of said beater elements.

7. In a foam apparatus, a casing, beater elements rotatably mounted within said casing, means for introducing foam ingredients into said casing to be whipped into foam by said beater elements, and a rotatably mounted dome associated with said casing and adapted to cause a uniform discharge of foam from said casing.

8. In a foam apparatus, a casing, beater elements rotatably mounted in said casing, discharge means associated with said casing, means for feeding a uniform quantity of foam solution into said casing, a mixing conveyor adapted to receive foam from said casing, and means for automatically stopping the movement of said solution feeding device when the movement of said conveyor stops.

9. In a foam apparatus, a foam cell casing, beater elements rotatably mounted within said casing, a solution feed casing connected to said cell casing, a series of dippers rotatably mounted within said solution casing and adapted to deliver a measured flow of foam solution into said cell casing to be whipped into foam by said beater elements and means for delivering a substantially uniform quantity of foam from said cell casing.

10. In a foam apparatus, the combination with a conveyor adapted to move plastic materials to a mixing device and means for moving said conveyor with a continuous motion, of a foam cell casing associated with said conveyor, beater elements rotatably mounted within said casing, a solution feed device adapted to cause a uniform flow of foam solution to said casing, means for discharging foam from said casing to said conveyor, and means for automatically stopping the movement and feeding of said feeding device, when the motion of said conveyor stops.

11. In a foam apparatus, a cylindrical casing arranged with its axis substantially vertical, a rotatably mounted shaft associated with said casing, beater elements associated with said shaft, a motor directly connected to said shaft, a rotatably mounted discharge dome associated with said casing, and means for causing the rotation of said discharge device at a speed different from that of the shaft.

12. In a foam apparatus, a casing, beater elements rotatably mounted within said casing, a solution feed means for supplying foam solution to said casing, a foam discharge device rotatably associated with said casing, a mixing conveyor adapted to receive foam from said discharge device, and driving means for said feed means and discharge device adapted to stop the motion of said feed means and discharge device when the motion of said conveyor stops.

FRED J. GOUGH.